United States Patent [19]

Kanoh

[11] 4,326,408
[45] Apr. 27, 1982

[54] AIRTIGHTNESS TESTING APPARATUS FOR WATCHES

[76] Inventor: Chiyuki Kanoh, 7-8-2-1006, Funabashi, Setagaya-ku, Tokyo, Japan

[21] Appl. No.: 119,373

[22] Filed: Feb. 7, 1980

[30] Foreign Application Priority Data

Feb. 9, 1979 [JP] Japan .............................. 54-15765[U]

[51] Int. Cl.³ .............................................. G01M 3/36
[52] U.S. Cl. ...................................... 73/49.3; 33/172 E
[58] Field of Search ................ 73/49.3, 40; 33/172 E, 33/1 L

[56] References Cited

U.S. PATENT DOCUMENTS 3,417,476 12/1968 Martens .
3,751,972 8/1973 Haas .
3,991,622 11/1976 Oowada ............................... 73/49.3

*Primary Examiner*—Kyle L. Howell
*Assistant Examiner*—Joseph W. Roskos

*Attorney, Agent, or Firm*—Schwartz, Jeffery, Schwaab, Mack, Blumenthal & Koch

[57] ABSTRACT

Disclosed is an airtightness testing apparatus for watches which is constructed as follows. A support block and a guide member having a seat to carry a watch to be examined are attached to a post at a vertical space from each other, the post being set up inside an airtight container which is pressurized or decompressed. A light emitting element and a light receiving element are embedded in the support block so as to face each other with a vertical gap inbetween. Inside a cavity adjoining the gap in the block, there are a screening plate vertically projected in the gap and a contact member solidly fixed to the plate. In a test, a needle-shaped bottom end portion of the contact member is brought in contact with the watch to be examined, the screening plate is moved by a distortion of the watch accompanying a change of the pressure inside the container, thereby restricting a luminous flux from the light emitting element, and the change of the luminous flux is converted into a change of photoelectric current and displayed visually.

11 Claims, 8 Drawing Figures

AIRTIGHTNESS TESTING APPARATUS FOR WATCHES

BACKGROUND OF THE INVENTION

This invention relates to an apparatus for testing the airtightness of watches, such as wristwatches, in order to judge their acceptability in waterproofness, more specifically to an apparatus examining the waterproofness of a watch by putting the watch in an airtight container, pressurizing or decompressing the interior of the container, and detecting a change of distortion of the watch caused by such pressurization or decompression to measure the degree of the airtightness of the watch.

Conventionally, there are two methods for testing the waterproofness of watches, especially wristwatches. One of these methods is an ocular check method to ascertain if any bubbles come out of a watch immersed in water, while the other is to measure a distortion of the watch caused by a change of air pressure.

With the former method, a watch to be examined will be penetrated by water if it is suffering from any substantial leak. Such trouble would be fatal to some watches which incorporate electronic circuits. Moreover, this method lacks in accuracy because it depends on the ocular observation.

Thereupon, the latter method has recently come into general use. This conventional method, however, has such drawbacks as mentioned below.

A prior art testing apparatus utilizing the change of distortion of a watch, for example, is so constructed that a moving iron core placed on the watch is moved by a change of distortion of the watch accompanying a change of pressure inside an airtight container, thereby changing the reactance of a coil, and that the degree of the distortion of the watch or the acceptability of the airtightness of the watch may be judged from the variation of reactance.

In such prior art apparatus, however, the reactance change has no linearity, that is, the variation of reactance is not in direct proportion to the distortion of the watch, so that it is difficult to make a quantitative measurement of the leak from the watch. Since the moving iron core is relatively heavy, it will cause the watch a substantial initial distortion when it is placed on the watch, thereby making it hard to grasp an accurate change of distortion of the watch. In order to detect the reactance, moreover, there are required a stabilized AC power source to excite the coil and a rectifier circuit for converting detected AC voltage into DC voltage. As a result, a detector circuit and a display circuit to notify an operator of detected information will be complicated in construction, and the apparatus as a whole will be increased in cost.

In another example of a prior art testing apparatus of this type, a coil connected to an external reactance measuring device is disposed untouched opposite a watch to be examined, a magnetic film is pasted on the facing surface of the watch, and a distortion of the watch caused by a change of pressure is detected as a reactance change. Despite the advantage of the untouched detection, in this case, the operation efficiency for testing is very low because of the trouble of pasting a magnetic film on the surface of each watch to be examined, as well as of tearing the film from the watch after each test.

SUMMARY OF THE INVENTION

The object of this invention is to provide an airtightness testing apparatus for watches capable of high-accuracy quantitative measurement of the airtightness of waterproof watches and ensuring simplified construction of electric detector circuit and reduced production cost.

In order to attain the above object, the apparatus of this invention is basically so constructed that a light emitting element to emit light in a regular luminous flux and a light receiving element to receive such light are disposed at a narrow space from each other to constitute a means for detecting a distortion of a watch to be examined, that a screening plate movably disposed in the space and a contact member touching the surface of the watch are combined to form a movable member, that the screening plate is moved within the space by the distortion of the watch which is caused by a change of the pressure inside an airtight container, thereby restricting the luminous flux from the light emitting element, and that the change of the luminous flux in size is converted into a change of photoelectric current, which is visually displayed outside of the container 10.

Thus, the apparatus of the invention enables quantitative detection of distortion with higher linearity by the use of a simpler electric circuit, as compared with the case of the conventional system which utilizes the reactance change. Moreover, since the screening plate and contact member constituting the movable member may be formed of sheet metal and plastic, respectively, the total weight of the movable member can be reduced, and hence the watch will never suffer any substantial undesirable initial distortion.

BRIEF DESCRIPTION OF THE DRAWINGS

This invention can be more fully understood from the following detailed description when taken in conjunction with the accompanying drawings, in which.

DETAILED DESCRIPTION OF PREFERRED EMBODIMENTS

Now there will be described in detail preferred embodiments of this invention with reference to the accompanying drawings.

Figure 1:
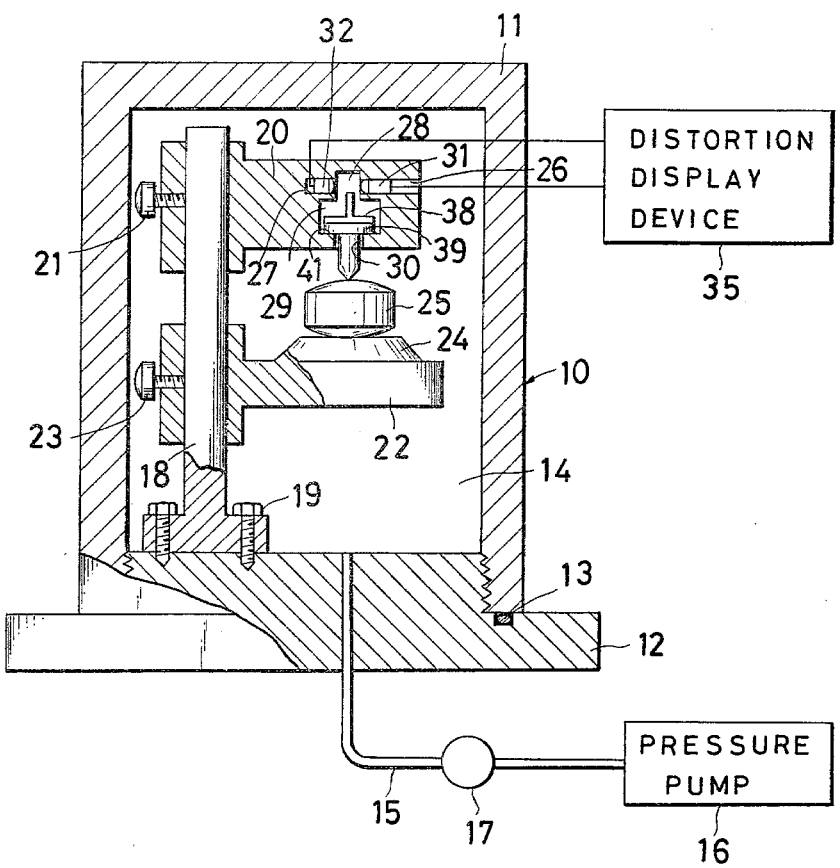
FIG. 1 is a profile of a first embodiment of the airtightness testing apparatus for watches of this invention.
Figure 2:
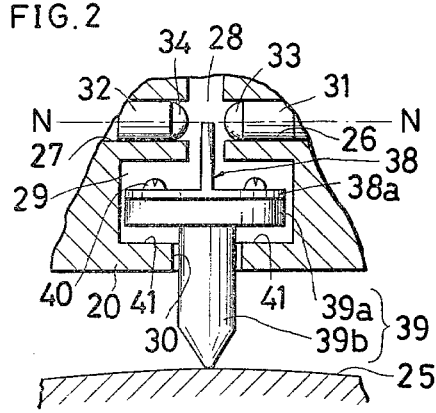
FIG. 2 is an enlarged view of the principal mechanism of the apparatus of FIG. 1.

In a first embodiment of this invention shown in FIGS. 1 and 2, an airtight container 10 is composed of a housing 11 and a base 12 which is screwed in the housing 11 with a seal ring 13 inbetween, defining an airtight chamber 14 therein. The housing 11 is provided at a suitable portion thereof with an opening (not shown) which is closed up tight with a hatch during a test. Since such construction is well-known in the art, it is excluded from illustration.

The base 12 is connected by means of a conduit 15 with a pressure pump 16 as a pressure control means to change the air pressure inside the airtight chamber 14, and a valve 17 is attached to the middle portion of the conduit 15.

Although the testing apparatus of this embodiment employs a system to pressurize the interior of the airtight chamber 14, a system to decompress the chamber may alternatively be applied to the apparatus.

Inside the container 10, a vertical post 18 is rigidly fitted with the base 12 by means of screws 19, and a support block 20 made of e.g. aluminium is fixed by means of a setscrew 21 to the post 18 in the vicinity of the upper end portion thereof such that it can be moved vertically. The block 20 cantilevers horizontally within the airtight chamber 14. The block 20 and post 18 constitute a support assembly.

At a substantially middle portion of the port 18, on the other hand, a guide member 22 to form a testing stand is movable fixed to the post 18 by means of a setscrew 23 so as to be able to be adjusted in its vertical position, cantilevering horizontally in the same manner as the block 20. On the top of the guide member 22 lies a seat 24 to carry a watch 25 to be examined, as illustrated. The guide member 22 and block 20 can be relatively vertically moved along the post 18 by adjusting their respective setscrews 23 and 21.

In a region near the free end of the support block 20, holes 26 and 27 are defined in alignment with each other in the horizontal or transverse direction, and a vertical narrow slit or gap 28 with a width of approximately 2.0 to 3.0 mm extends between these holes at right angles thereto. Further, an extended cavity 29 and a hole 30 which communicates with the cavity 29 and opens on the under surface of the block 20 are defined below the gap 28.

A light emitting element 31 and a light receiving element 32 as mentioned later in detail are fixedly embedded in the holes 26 and 27, respectively. These two elements 31 and 32 are electrically connected to a distortion display device 35 represented by a block outside the container 10.

The light emitting element 31 is formed of e.g. a light emitting diode (hereinafter referred to as LED), while the light receiving element 32 is formed of e.g. a phototransistor. The two elements 31 and 32 are provided respectively with built-in lenses 33 and 34 so that a light emitted from the light emitting element 31 may fall upon the light receiving element 32 as a horizontal luminous flux with a regular width.

The slit or gap 28 forms an optical path of the luminous flux with the given width that is emitted from the light emitting element 31.

A screening plate 38, which extends vertically inside the gap 28, is made of sheet metal material, such as brass, with a thickness of approximately 0.5 mm. The plate 38 is composed of a vertical portion and a horizontal base portion 38a at right angles thereto, forming as a whole an inverted T-shape. Further, the plate 38 is housed in the cavity 29 of the support block 20. Part of the plate 38 entering in the gap 28 is rectangular, and the top end face of such part is horizontal.

A substantially T-shaped contact member 39 is solidly fixed to the screening plate 38. That is, the contact member 39 is fixed at a horizontal base portion 39a to the base portion 38a of the plate 38 by means of screws 40. A vertical needle portion 39b protrudes downward through the vertical hole 30 of the support block 20. The needle portion 39b is in alignment with the vertical portion of the plate 38 in the vertical direction so that it may be brought in proper contact with an examination point on the top face of the watch 25 to be examined which is placed on the seat 24. Integrally formed of plastic, such as nylon or Delrin (polyacetal), the contact member 39 is extremely light.

Thus, the screening plate 38 and contact member 39 constitute a movable member, which, guided by the cavity 29 and vertical hole 30 of the block 20, is so controlled as to be able to substantially move only in the vertical direction. Normally, the movable member is held in a position where the base portion 39a of the contact member 39 abuts a shoulder portion 41 of the block 20, as shown in FIG. 1. Such position corresponds to the lowest position that the movable member can reach.

In a test, the plate 38 is raised until its top end reaches a datum line N—N in the middle of the optical path as shown in FIG. 2. As a result, the contact member 39 is removed from the shoulder portion 41 of the block 20.

First, in conducting an airtight test for a watch on the testing apparatus of the invention with the above-mentioned construction, the hatch (not shown) of the airtight container 10 is opened, and the to-be-examined watch 25 is introduced into the airtight chamber 14 and set on the seat 24 by an operator. Then, the testing stand or guide member 22 is hoisted to bring the top face of the watch 25 into touch with the needle portion 39b of the contact member 39 by adjusting the setscrew 23. Further, the guide member 23 is additionally raised so as to locate the top end of the plate 38 of the datum line N—N, when the setscrew 23 is tightened to fix the guide member 22. Whether or not the top end of the plate 38 is located on the datum line N—N is monitored by a meter, as mentioned later.

Thus, after the watch 25 is set, the hatch is closed, the valve 17 is opened, compressed air is introduced from the pressure pump into the airtight chamber 14, and the pressure inside the chamber 14 is boosted to approximately 7 kg/cm$^2$.

Accordingly, when the watch 25 inside the chamber 14 is pressurized, the surface of the watch is somewhat squeezed to be distorted by the difference between the air pressures inside the watch and inside the airtight chamber 14. In consequence, the contact member 39 touching the watch surface is lowered, and the screening plate 38 is also lowered from the datum line N—N. As a result, the amount of luminous flux arrested by the screening plate 38 is reduced, so that the size of the luminous flux from the light emitting element 31 to the light receiving element 32 is increased. The change of the luminous flux is transmitted as an electric signal from the light receiving element 32 to the external distortion display device 35, and the degree of distortion of the watch is offered to the operator as a visual information, for example.

Referring now in particular to the specific circuit diagram of FIG. 6, there will be described the arrangement and function of the distortion display device 35.

Figure 6:
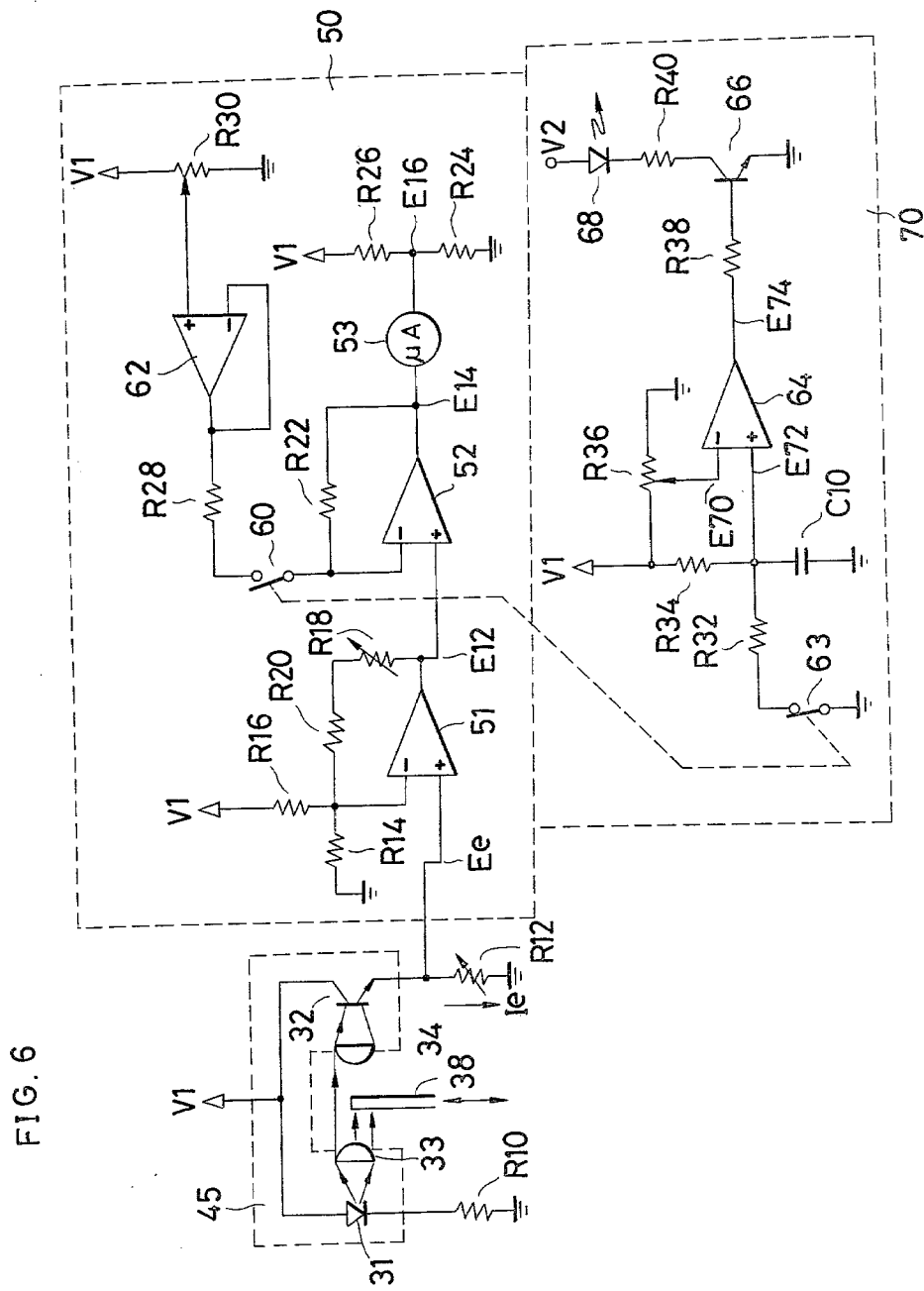
FIG. 6 shows a specific circuit arrangement of a distortion display device represented by a block in FIG. 1.

In FIG. 6, the distortion display device 35 shown in FIG. 1 includes a display circuit 50 and a timer circuit 70. A photo-interrupter 45 includes the LED 31 as the light emitting element and the photo-transistor 32 as the light receiving element. The anode of the LED 31 is connected to a first power source V1 with stabilized voltage, while the cathode is grounded through a resistor R10. The collector of the photo-transistor 32 is connected to the power source V1, and the emitter is grounded through a variable resistor R12. A light emitted from the LED 31 is converged on the P-N junction part of the photo-transistor 32 by means of the lenses 33 and 34. The optical path between the lenses 33 and 34 is partially intercepted by the screening plate 38.

If the voltage of the power source V1 is constant, then the luminous intensity of the light from the LED 31 will be constant. On the other hand, the size of the luminous flux incident upon the photo-transistor 32 changes substantially in proportion to the degree of screening by the screening plate 38. If the range of the vertical movement of the screening plate 38 is narrower enough (e.g. 1/10 or less) than the width of the optical path between the lenses 33 and 34, the moved distance of the screening plate 38 may be regarded as directly proportional to emitter current Ie of the photo-transistor 32. Namely, a voltage drop caused in the resistor R12 or emitter potential Ee of the photo-transistor 32 corresponds exactly to the moved distance of the screening plate 38. In other words, the vertical movement of the screening plate 38, i.e. the change of the outward thickness of the watch 25, may be detected by measuring the potential Ee.

As means for measuring the potential Ee, there may be utilized two systems, digital and analog. In the case of the digital system, it is necessary only that the potential Ee be measured by means of a conventional digital voltmeter. FIG. 6 shows the analog system, however.

The potential Ee is applied to the non-inverted input terminal of an amplifier 51. The inverted input terminal of the amplifier 51 is grounded through a resistor R14, and also is connected to the power source V1 through a resistor R16. The output terminal of the amplifier 51 is connected to the inverted input terminal thereof via series-connected feedback resistors R18 and R20. Closed-loop gain A51 of the amplifier 51 can be adjusted by varying the value of the resistor R18. Output potential E12 of the amplifier 15 may be represented by A51 times Ee. The potential Ee and gain A51 can be adjusted by controlling the resistors R12 and R18, respectively. Once the screening plate 38 is located in place, therefore, the level of the potential E12 can be decided by alternately adjusting the resistors R12 and R18. If the variations of the photoelectric exchange characteristic of the LED 31 and photo-transistor 32 are small enough, the adjustment of the resistor R18 may be omitted.

The potential E12 is applied to the non-inverted input terminal of an amplifier 52. The output terminal of the amplifier 52 is connected to the inverted input terminal thereof through a resistor R22. Further, the output terminal of the amplifier 52 is connected with one end of an ammeter 53. The other end of the ammeter 53 is grounded through a resistor R24 and connected to the power source V1 through a resistor R26. The ammeter 53 gives instructions in response to the vertical motion of the screening plate 38, and the judgment on the acceptability of the airtightness of the watch is made in accordance with the instructions from the ammeter 53.

The inverted input terminal of the amplifier 52 is connected to the output terminal of an amplifier 62 through a switch 60 and a resistor R28. The same output terminal is connected with the inverted input terminal of the amplifier 62. The non-inverted input terminal of the amplifier 62 is connected to the slider of a variable resistor R30 which is connected between the power source V1 and the ground circuit.

The circuit components R14 to R30, 51, 52, 53, 60 and 62 constitute the display 50, which is operated as follows.

First, the switch 60 is turned off. When the switch 60 is off, the amplifier 52 serves as a buffer amplifier with a gain "1", so that output potential E14 of the amplifier 52 is equal to the potential E12. If the node potential between the resistors R24 and R26 is E16, the ammeter 53 indicates a value corresponding to a potential difference E14−E16. After the watch 25 is set on the seat 24 of the testing stand, as shown in FIG. 1, the resistors R12 and R18 are so set that the ammeter 53 may indicate a predetermined value or zero point when the pressure inside the container 10 is at normal pressure (1 atm.).

Subsequently, the switch 60 is turned on. Then, gain A52 of the amplifier 52 becomes approximately R22/R28. If R22=9.1 kΩ and R28=1.6 kΩ are given, for example, we obtain A52≃6.7. Thus situated, the resistor R30 is so adjusted that the ammeter 53 may indicate the zero point. When such adjustment is finished, the switch 60 is turned off again.

Figure 5A:
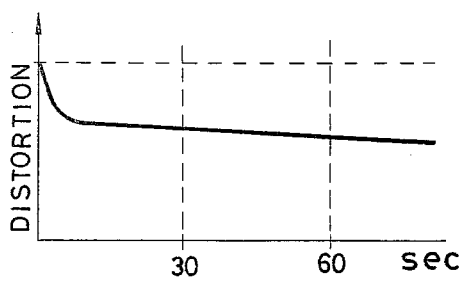
FIGS. 5a, 5b and 5c are graphs showing measurement results of distortion of a watch, in which axes of ordinate and abscissa represent the change of the degree of distortion and the passage of time, respectively.

Thus, the preperation for a measurement of distortion is completed. In conducting an airtight test for the watch, as soon as the interior of the container is, for example, pressurized to a predetermined level of air pressure, the switch 60 is turned on. Then, the watch 25 is distorted according to the difference between the internal pressure of the watch 25 and the air pressure inside the container 10; and the screening plate 38 is lowered. By the descent of the screening plate 38, the degree of the screening of the optical path of the interrupter 45 is reduced, and the current Ie is increased. As a result, the potential Ee is raised. The rise of the potential Ee is amplified by the amplifiers 51 and 52 to increase the potential E14. The rise of the potential E14 appears as a deflection of the indicator of the ammeter 53. That is, the deviation of the indicator of the ammeter 53 from the zero point is in proportion to the moved distance of the screening plate 38. If the airtightness of the watch is satisfactory, the indication of the ammeter 53 varies as shown in FIG. 5a. If the airtightness is unsatisfactory or very poor, however, there will be observed such a variation of the indicator as shown in FIG. 5b or 5c, respectively.

Figure 5B:
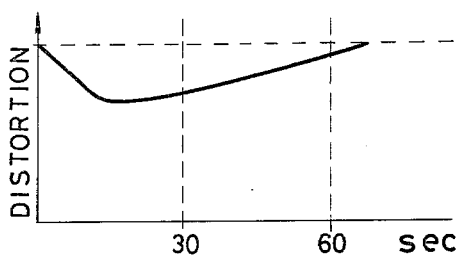
Figure 5C:
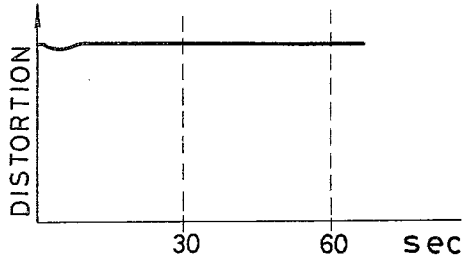

In the case of the analog system, the indicator of the ammeter 53 varies in curves as shown in FIGS. 5a to 5c. Therefore, the airtightness of the watch can be measured by observing the change of the indicator. Referring to FIGS. 5b and 5c, for example, let us suppose a time 60 seconds after the start of the pressurization. In this case, if the change of the indicator is ignored, the state of the indicator at that time can tell only that the airtightness of the watch is poor. By observing the change of the indicator during the period of 60 seconds after the start of the pressurization, however, we can see the difference in the cause of the defective airtightness between the cases shown in FIGS. 5b and 5c. That is, the variation shown in FIG. 5c suggests not only the mere defectiveness in airtightness but also the existence of a substantial leak or hole in the watch. As regards the digital system, on the other hand, it is difficult to make a visual observation of such change. However, the digital system is preferred in a case where the absolute value of the moved distance of the screening plate 38 need be measured. In some cases, a digital voltmeter may be added to the circuit arrangement of FIG. 6 to provide an analog-digital system.

The time to judge the acceptability of the air-tightness of the watch after the switch 60 is turned on (e.g., 60 seconds after the ON-operation of the switch 60) is indicated by a timer 70.

The switch 60 is connected with a switch 63 such that the switch 63 can be operated in cooperation with the switch 60. One end of the switch 63 is grounded, while the other end is connected to the noninverted input terminal of an amplifier 64 through a resistor R32. The non-inverted input terminal is grounded through a capacitor C10 and connected to the power source V1 through a resistor R34. A variable resistor R36 is connected between the power source V1 and the ground circuit. The slider of the resistor R36 is connected to the inverted input terminal of the amplifier 64. The output terminal of the amplifier 64 is connected to the base of an NPN transistor 66 through a resistor R38. The emitter of the transistor 66 is grounded, and its collector is connected to a second power source V2 through a resistor R40 and the cathode-anode path of an LED 68. The power source V2 need not have its voltage stabilized.

The circuit components 63, C10, R32 to R40, 64, 66 and 68 constitute the timer circuit 70. While the switch 63 is on, potential E70 at the inverted input terminal of the amplifier 64 is higher than potential E72 at the non-inverted input terminal of the same amplifier. Accordingly, output potential E74 of the amplifier 64 is at the low level, and the LED 68 is off. When the switch 63 is turned off in response to the ON-operation of the switch 60, the capacitor C10 is charged through the resistor R34. The speed of such charging or the rising speed of the potential E72 depends upon the time constant R34 times C10. While E70 > E72 is given, the transistor 66 is off. When the capacitor C10 is charged heavilly enough to provide E70 ≧ E72, the potential E74 goes high. Then, the transistor 66 is turned on, and the LED 68 is lighted. Namely, the LED 68 goes on in a predetermined time (e.g., 60 seconds) after the switch 63 is turned off. The lighting of the LED 68 indicates the end of the operation of the timer 70 or the time to judge the acceptability.

The aforesaid predetermined time may be varied by changing the potential E70 through the resistor R36 even if the time constant R34 times C10 is fixed. Let it be supposed, for example, that the voltage of the power source V1, the resistance of the resistor R34, and the capacitance of the capacitor C10 are 12 V, 1 MΩ and 47 μF, respectively. In this case, the time required for the lighting of the LED 68 after the switch 63 is turned off can be set at 30 to 60 seconds by suitably adjusting the resistor R36.

As the amplifiers 51, 52, 62 and 64 of FIG. 6 which each constitute a DC amplifier, operational amplifiers with high open-loop gain and small drift are preferred.

As for the ammeter 53, it may be replaced by a display device of a bar-graph type utilizing a liquid crystal device (LCD) or LED array. For such device, conventional ones which have recently been in general use as level indicators for cassette tape recorders and the like will do. Alternatively, the potential E14 may be applied to a voltage-controlled oscillator (VCO) (not shown) in order that a change of the potential E14 may be indicated as a change of an acoustic pitch. For the VCO, there may be utilized conventional ones that are widely used for electronic musical instruments, such as synthesizers.

Figure 3:
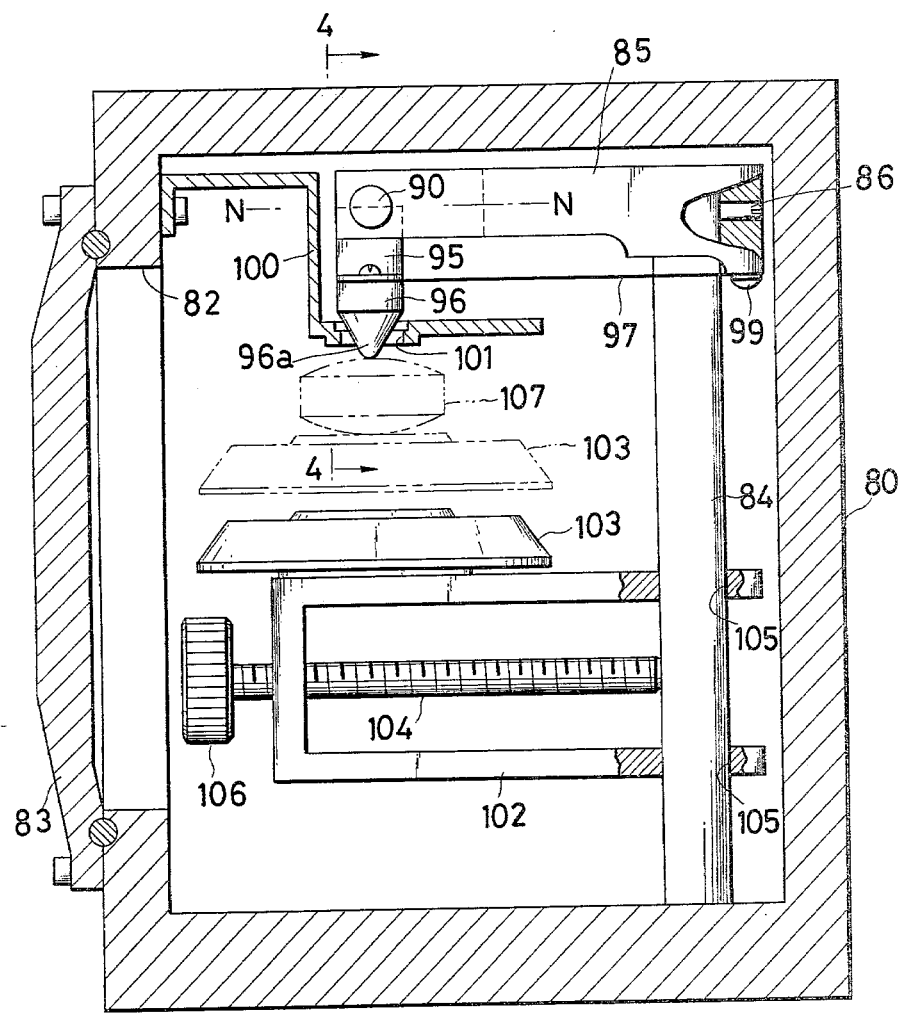
FIG. 3 is a profile of a second embodiment of the airtightness testing apparatus of the invention.
Figure 4:
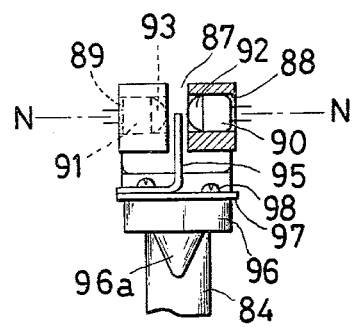
FIG. 4 is a sectional view as taken along line 4—4 of FIG. 3.

FIGS. 3 and 4 show an airtightness testing apparatus according to a second embodiment of this invention. The apparatus of this embodiment shares the principle to detect distortion of a watch with the first embodiment.

In FIG. 3, an airtight container 80 defining an airtight chamber 81 therein has an opening 82 to which a hatch 83 is attached airtightly. The airtight chamber 81 is connected with a pressurization device (not shown) such as a pressure pump similar to the one shown in FIG. 1. In measuring the airtightness of a watch, the interior of the airtight chamber 81 is pressurized to a predetermined level of air pressure.

Inside the airtight chamber 81, there is a post 84 rigidly set up in the vertical direction. A support block 85, which constitutes together with the post 84 a support assembly, is fixed to the upper end portion of the post 84 by means of a fixing pin 86. A vertical gap 87 with a width of 2.0 to 3.0 mm is defined in the horizontally extended free end portion of the support block 85, and a pair of fitting holes 88 and 89 are defined in the block 85 at right angles to the gap 87. As may be seen from FIG. 4, the fitting holes 88 and 89 are arranged in horizontal alignmennt with each other with the gap 87 inbetween. A light emitting element 90 and a light receiving element 91 are fitted respectively in these holes 88 and 89, facing each other with lenses 92 and 93 inbetween. The light emitting element 90 is formed of e.g. a light emitting diode (hereinafter referred to as LED), while the light receiving element 91 is formed of e.g. a phototransistor. A light emitted from the light emitting element 90 falls upon the light receiving element 91 as a luminous flux with a regular width.

Like the case of the embodiment of FIG. 1, the light emitting element 90 and light receiving element 91 are electrically connected to a distortion display device (not shown).

A screening plate 95 and a contact member 96 are united in a body to constitute a movable member. The screening plate 95 is formed of brass or some other sheet metal of 0.5 mm thickness in the shape of an inverted T, as shown in FIG. 4. The plate 95 is fixed to the contact member 96 formed of plastic, such as nylon or Delrin, by means of screws 98 with the free end portion of a leaf spring 97 inbetween. A conical needle portion 96a of the contact member 96 is in vertical alignment with a portion of the plate 95 capable of vertical movement within the gap 87.

Since the basal end portion of the leaf spring 97 is fixed to the support block 85 by means of a screw 99, the movable member is elastically supported by the spring 97. The spring 97 is formed of e.g. a phosphor bronze plate. A round hole is bored in the spring 97 at a portion thereof corresponding to the post 84, thereby making room for the post.

Supported by the leaf spring 97, as mentioned above, the movable member has its lowest locatable position restricted by a guide member 100 which is fixed on the inside wall of the container 80. Namely, the movable member is stopped when the contact member 96 runs against the stepped edge of a hole 101 in the guide member 100.

A testing stand member 102 with a seat 103 is vertically adjustably attached to the lower portion of the post 84 by means of an adjust screw member 104. That is, the testing stand member 102 is provided with holes 105 which are penetrated by the post 84, and the screw member 104 is screwed in the testing stand member 102, having its tip end in contact with the post 84. Thus, the testing stand member 102 may be fixed to the post 84 at an optional height by turning a knob 106 of the screw member 104.

A watch 107 to be examined is placed on the seat 103.

First, in conducting an airtight test for a watch, the hatch 83 is opened, the watch 107 is set on the set 103, and the testing stand member 102 is hoisted to bring the top face of the watch 107 into touch with the needle portion 96a of the contact member 96. Then, the testing stand member 102 is further raised until the rectangular top end portion of the screening plate 95 is located just on a datum line N-N. FIGS. 3 and 4 show a state in which the movable member is set in a datum position. Like the case of the first embodiment shown in FIG. 2, the datum line N-N corresponds to the height or position of the central axis of the optical path.

Thereafter, the hatch 83 is closed, and the interior of the airtight chamber 81 is pressurized. As a result, the surface of the watch 107 is distorted, so that the movable member is lowered, and the plate 95 changes the size of a luminous flux from the light emitting element 90 to the light receiving element 91. Such change of the luminous flux is transmitted as an electric signal to the distortion display device, where it is indicated as a change of photoelectric current by an external meter in the same manner of the first embodiment. The circuit arrangement of this apparatus is as shown in FIG. 6.

If an examination of a watch results in the diagram or curve of FIG. 5a for the relationship between the distortion of the watch and the time, then the watch will be judged to have good airtightness. If the curve of FIG. 5b is obtained, the watch will be regarded as poor in airtightness. Further, the curve of FIG. 5c will lead to a conclusion that the watch examined is subject to a substantial leak. These judgments or conclusions are visually displayed on a meter outside the container 80.

What is claimed is:

1. An airtightness testing apparatus for watches, comprising:
   an airtight container;
   pressure control means capable of being so operated as to pressurize or decompress the interior of said container;
   a testing stand having a seat to carry a watch to be examined inside said airtight container;
   adjusting means to move said testing stand in the vertical direction for the adjustment of the position of said stand;
   means for detecting a distortion of the to-be-examined watch which is caused by a change of the pressure inside said airtight container due to the operation of said pressure control means;
   a support assembly supporting at least part of said detecting means; and
   a distortion display device providing an operator with a change of distortion detected by said detecting means, characterized in that said detecting means includes;
   a light emitting element supported by said support assembly and emitting light as a luminous flux of a regular size,
   a light receiving element supported by said support assembly so as to face said light emitting element with a fixed gap inbetween and supplying a first signal corresponding to the size of the luminous flux produced from said light emitting element, and a movable member composed of a contact portion touching said watch and capable of vertical movement in accordance with the change of distortion of said watch and a screening plate portion accompanying said contact member to move vertically in said gap and restricting the luminous flux from said light emitting element to said light receiving element, thereby changing the size of the luminous flux received by said light receiving element, and that said distortion display device includes;
   a display circuit to indicate the change of said first signal.

2. An airtightness testing apparatus according to claim 1, wherein said detecting means movable member comprises a means for changing the size of the luminous flux in a linear relationship to said change of distortion.

3. An airtightness testing apparatus according to claim 1 or 2, wherein said light emitting element and said light receiving element are formed of an LED (light emitting diode) and a photo diode or photo-transistor, respectively.

4. An airtightness testing apparatus according to claim 1 or 2, wherein said screening plate portion and said contact portion of said movable member are formed of metal and plastic materials, respectively, and are solidly fixed on each other.

5. An airtightness testing apparatus according to claim 1 or 2, wherein said support assembly is composed of a post vertically set up inside said airtight container and a support block supported by the upper end portion of said post and extending horizontally, said support block having fitting holes defined therein whereby said light emitting element and light receiving element are respectively held in place and brought in alignment with each other in the horizontal direction, said gap being defined in the form of a vertical slit between both said fitting holes.

6. An airtightness testing apparatus according to claim 5 further comprising a leaf spring fixed to said movable member and having one end fixed to said post and the other end extended horizontally.

7. An airtightness testing apparatus according to claim 5, wherein said support block includes a cavity communicating with said vertical gap so as partially to contain said movable member and abutment means to support said movable member.

8. An airtightness testing apparatus according to claim 1 or 2, wherein said support assembly includes a fixed post set up vertically, and said adjustment means is composed of a guide member fixed to said seat and vertically movable supported by said post and an adjust screw member to fix said guide member to said post at a suitable position.

9. An airtightness testing apparatus according to claim 1 or 2, wherein said detecting means further includes a lens for converting the luminous flux emitted from said light emitting element into a substantially parallel light, and the optical path between said lens and said light receiving element is partially intercepted by said screening plate, the change of the luminous flux in size due to said partial screening corresponding to said first signal.

10. An airtightness testing apparatus according to claim 1 or 2, wherein said display device includes a first amplifier circuit which has a fixed gain and produces a second signal changing in accordance with the change of said first signal, a second amplifier circuit which has a variable gain and produces a third signal having a level corresponding to that of said second signal, and a meter for indicating a value corresponding to the level of said third signal, and wherein said second amplifier circuit is set at a first gain before said screening plate is so adjusted as to screen nearly half of the luminous flux between said light emitting element and said light receiving element after said watch is put on said testing stand, and said second amplifier circuit is set at a second gain higher than said first gain in measuring the change of distortion of said watch after completion of said adjustment.

11. An airtightness testing apparatus according to claim 10, wherein said distortion display device further includes a timer for indicating the passage of a predetermined time after the gain of said second amplifier circuit is switched from said first gain to said second gain, whereby the time to judge the acceptability of the airtightness of said watch after the pressurization or decompression by said pressure control means is performed is indicated.

* * * * *